(12) United States Patent
Asakura

(10) Patent No.: US 8,848,071 B2
(45) Date of Patent: Sep. 30, 2014

(54) IMAGING APPARATUS THAT SWITCHES BETWEEN HARDWARE IMAGE PROCESSOR AND SOFTWARE IMAGE PROCESSOR

(75) Inventor: Naoto Asakura, Chiba (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/603,536

(22) Filed: Sep. 5, 2012

(65) Prior Publication Data

US 2013/0057716 A1    Mar. 7, 2013

(30) Foreign Application Priority Data

Sep. 6, 2011   (JP) ................................. 2011-193796

(51) Int. Cl.
| | |
|---|---|
| H04N 5/235 | (2006.01) |
| H04N 5/228 | (2006.01) |
| H04N 5/232 | (2006.01) |
| H04N 5/367 | (2011.01) |

(52) U.S. Cl.
CPC ......... *H04N 5/23245* (2013.01); *H04N 5/2351* (2013.01); *H04N 5/367* (2013.01)
USPC ..................... 348/229.1; 348/222.1

(58) Field of Classification Search
USPC ............... 348/216.1, 221.1, 714, 223–229.1
See application file for complete search history.

(56) References Cited

U.S. PATENT DOCUMENTS

| | | | |
|---|---|---|---|
| 2007/0230779 A1* | 10/2007 | Sato ............................... | 382/167 |
| 2010/0073529 A1* | 3/2010 | Uchida ......................... | 348/262 |
| 2012/0044392 A1* | 2/2012 | Takenaka et al. ............. | 348/246 |
| 2012/0044405 A1 | 2/2012 | Kimura et al. | |

FOREIGN PATENT DOCUMENTS

JP     2007-274504     10/2007

* cited by examiner

*Primary Examiner* — Mekonnen Dagnew
(74) *Attorney, Agent, or Firm* — Greenblum & Bernstein, P.L.C.

(57) ABSTRACT

An imaging apparatus capable of capturing a moving image with an imaging device is equipped with a first image-processing device that uses hardware to process images captured by the imaging device and a second image-processing device that processes captured images with software. The imaging apparatus includes an image-processing switching device that selectively operates one of either the first image-processing device or the second image-processing device. The imaging apparatus includes a light-detection device that detects the amount of light received by the imaging device and a sensitivity adjustment device that increases the sensitivity of the imaging device as the amount of light decreases. The image-processing switching device operates the first image-processing device when the sensitivity is lower than a predetermined value and operates the second image-processing device when the sensitivity is higher than the predetermined value.

8 Claims, 4 Drawing Sheets

IMAGING APPARATUS THAT SWITCHES BETWEEN HARDWARE IMAGE PROCESSOR AND SOFTWARE IMAGE PROCESSOR

BACKGROUND OF THE INVENTION

1. Field of the Invention

The present invention relates to an imaging apparatus that performs a correction process on a moving image.

2. Description of the Related Art

Hitherto, for imaging apparatuses that capture moving images a technique has been developed so that an image signal can be processed while a predetermined frame rate is maintained. There is a known method that uses software to process a moving image signal after it has been processed using hardware. Accordingly, the number of times a memory expansion process is carried out may be suppressed to a minimum to reduce the entire processing time so that the image signal can be processed without decreasing the frame rate, as described in US Unexamined Patent Publication No. US2007-230779A.

SUMMARY OF THE INVENTION

In the image-processing technique that uses hardware, a defective pixel is corrected by replacement with another pixel. However, when an increase in the sensitivity of the imaging device is accompanied by an increase in the number of defective pixels as correction targets, noticeable degradation of the image occurs due to the transfer, that is, the replacement of defective pixels. Therefore, an object of the present invention is to provide an imaging apparatus capable of producing a high-precision moving image even when the sensitivity of an imaging device is high.

According to one aspect of the invention, there is provided an imaging apparatus capable of capturing a moving image with an imaging device, the imaging apparatus including: a first image-processing unit that uses hardware to process an image captured by the imaging device; a second image-processing unit that uses software to process the image captured by the imaging device; an image-processing switching unit that selectively operates one of either the first image-processing unit or the second image-processing unit; a light-detection unit that detects the amount of light received by the imaging device; and a sensitivity adjustment unit that increases the sensitivity of the imaging device as the light amount decreases. The image-processing switching unit operates the first image-processing unit when the sensitivity is lower than a predetermined value and operates the second image-processing unit when the sensitivity is higher than the predetermined value.

According to the present invention, it is possible to provide an imaging apparatus that is capable of obtaining a high-precision moving image even when the sensitivity of the imaging device is high.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

Figure 1:
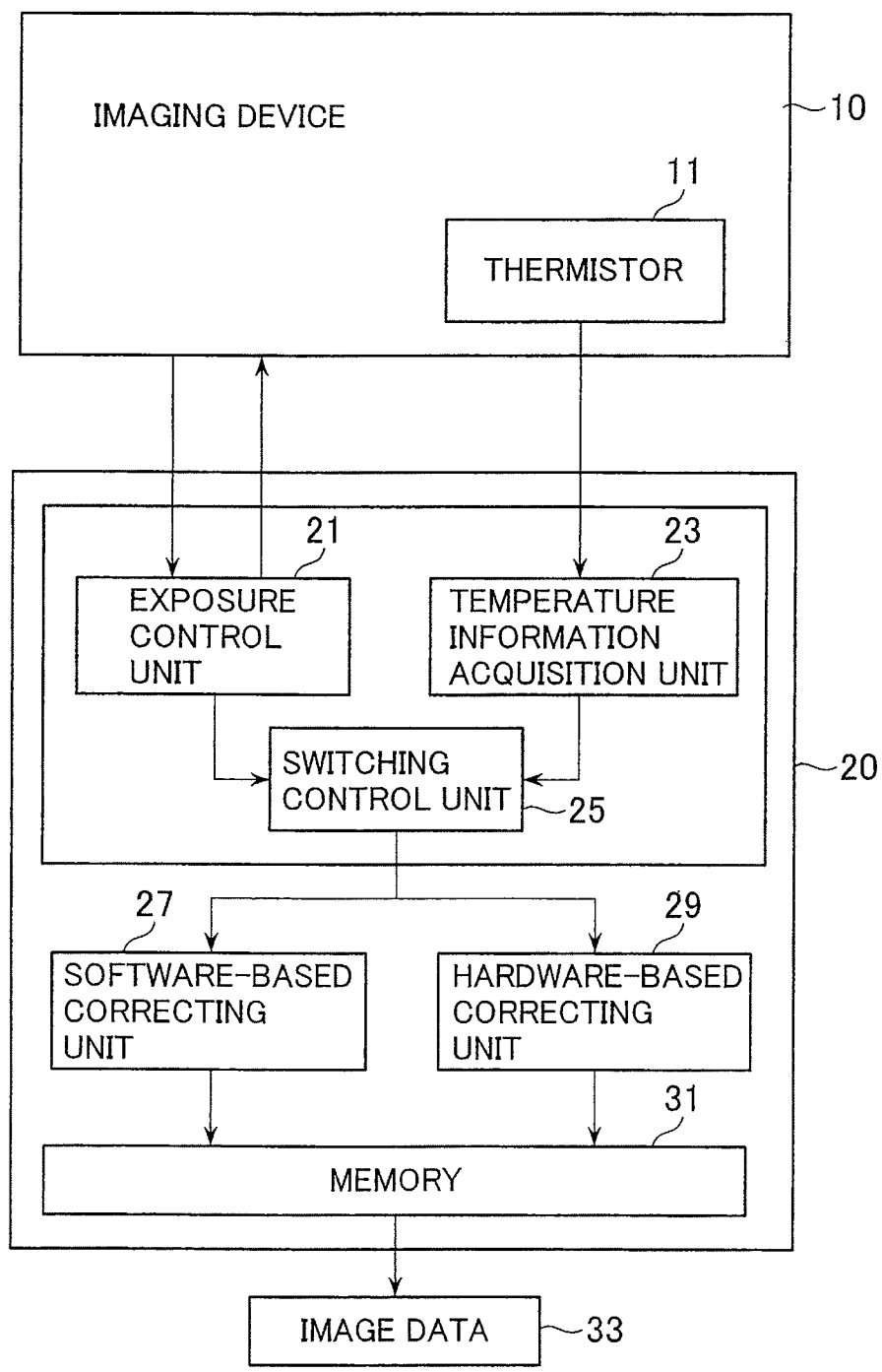
FIG. 1 is a block diagram illustrating an embodiment of the invention.

Hereinafter, a first embodiment of the invention will be described by referring to the drawings. FIG. 1 is an electrical schematic diagram of a digital camera according to the present invention. An image signal, which is generated by an imaging device 10, is processed in an electronic control unit 20 and image data 33 is output to a monitor (not illustrated).

The imaging device 10 is equipped with a thermistor 11 which detects the temperature of the imaging device 10. The exposure control unit 21 is electrically connected to the imaging device 10 and performs various controls including the setting of the sensitivity of the imaging device 10. A temperature information acquisition unit 23 is connected to the thermistor 11 and detects the temperature of the imaging device 10. As described below, a switching control unit 25 selectively operates one of either a software-based correcting unit 27 or a hardware-based correcting unit 29 depending on information from the exposure control unit 21 and the temperature information acquisition unit 23 (an image-processing switching unit). The software-based correcting unit 27 uses software to process image signals captured by the imaging device in accordance with the switching control of the switching control unit 25 (a second image-processing unit). The hardware-based correcting unit 29 uses hardware to process image signals captured by the imaging device in accordance with the switching control of the switching control unit 25 (a first image-processing unit). A memory 31, which is connected to the software-based correcting unit 27 and the hardware-based correcting unit 29, temporarily stores a corrected image. The image data 33, which represent an image signal stored in the memory 31, are output for every frame.

Figure 2:
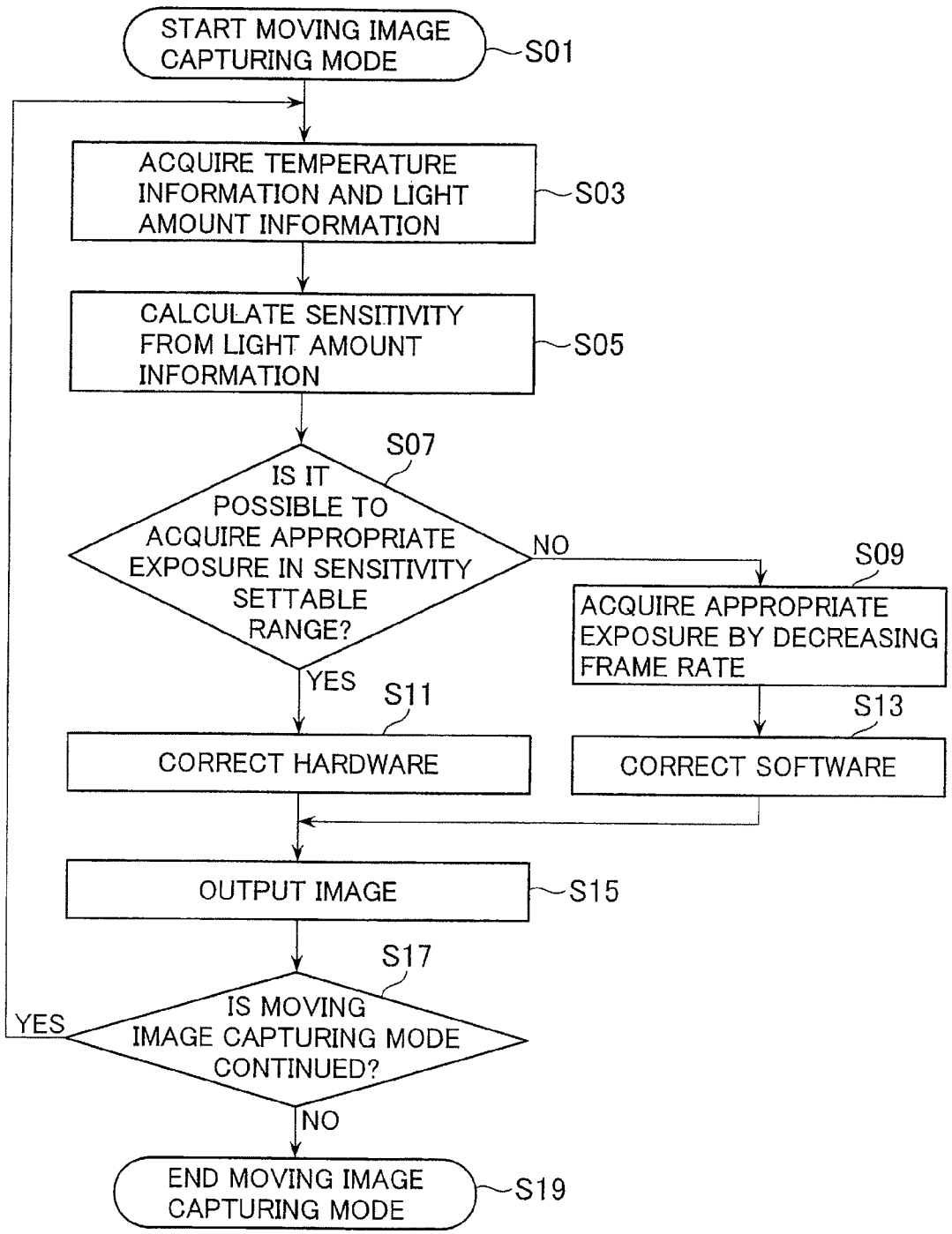
FIG. 2 is a flowchart of a first embodiment.

The effect of the embodiment will be described by referring to FIGS. 1 and 2. As specifically described below, FIG. 2 is a flowchart in which a defective pixel is corrected by using software-based image processing when the sensitivity is at the upper limit value and the frame rate of the moving image capture mode is set lower than the frame rate of a normal imaging mode to facilitate a proper exposure. In the normal imaging mode, the frame rate is set at 30 frames per second (fps).

In step S01, a moving image capture mode is initiated. In step S03, the temperature information acquisition unit 23 acquires the temperature of the imaging device 10 detected by the thermistor 11 (a temperature acquisition unit). In step S05, the exposure control unit 21 calculates the sensitivity by detecting the amount of light incident on the imaging device 10 (the light detection unit) and adjusts the sensitivity with respect to the imaging device 10 (a sensitivity-adjustment unit).

In step S07, it is determined whether the proper exposure can be obtained when the sensitivity set in the switching control unit 25 is increased to the upper limit value. The upper limit value of the sensitivity is set to a value based on light data that is stored in advance in the exposure control unit 21. When it is determined that the appropriate exposure is not possible, the routine proceeds to step S09. In step S09, the exposure control unit 21 is able to achieve the proper exposure by decreasing the frame rate from, for example, 30 fps to 15 fps. Next, in step S13, the software-based correction unit 27 uses software to correct the image signal, and the corrected image signal is temporarily stored in the memory 31.

Here, in step S07, when it is determined that the proper exposure can be obtained with the sensitivity in the adjustable range, the routine proceeds to step S11. In step S11, the hardware-based correction unit 29 uses hardware to correct the image signal, and the corrected image signal is temporarily stored in the memory 31.

If the image signal is corrected in either step S11 or step S13, the routine proceeds to step S15. In step S15, the corrected image signal stored in the memory 31 is output for every frame. In step S17, when it is determined that the moving image capture mode is continued, the routine returns to step S03. However, when it is determined that the moving image capture mode is not continued, the moving image capture mode ends in step S19.

In this way, in the first embodiment when the proper exposure is not possible when the sensitivity is set to the upper limit value, the proper exposure may be still be obtained by decreasing the frame rate. Further, since a greater amount of image-processing time may be required compared to the normal imaging mode when the frame rate is decreased, the image can be corrected with software. Accordingly, even when the sensitivity of the imaging device is high, a high-precision image may be produced.

Figure 3:
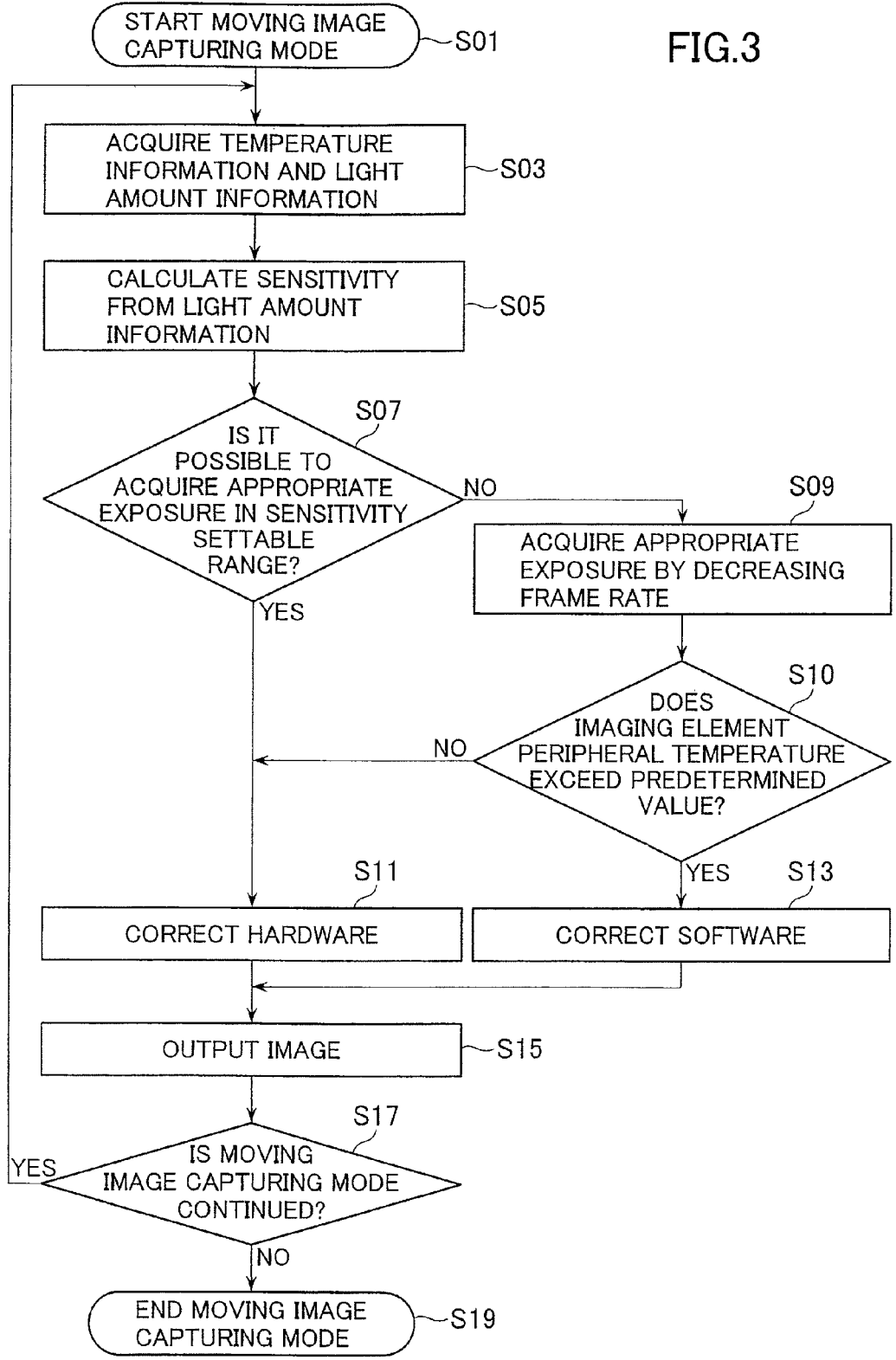
FIG. 3 is a flowchart of a second embodiment.

A second embodiment will be described by referring to FIG. 3. The electrical configuration of the second embodiment is the same as that of the first embodiment illustrated in FIG. 1. In FIG. 3, the same numerical reference figures are given to the same processes as those of the first embodiment. The second embodiment is different from the first embodiment due to the addition of step S10. As specifically described below, FIG. 3 is a flowchart in which a defective pixel is corrected by using software-based image processing when the temperature detected by the temperature information acquisition unit 23 exceeds a predetermined value, the sensitivity is at the upper limit value, and the frame rate of the moving image capture mode is set lower than the frame rate of a normal imaging mode in order to obtain a proper exposure.

When the frame rate is decreased in step S09, the switching control unit 25 determines whether the temperature of the imaging device 10 exceeds a predetermined value in step S10. When it is determined that the temperature of the imaging device 10 exceeds the predetermined value, step S13 is carried out. When it is determined that the temperature of the imaging device 10 does not exceed the predetermined temperature, step S11 is performed.

There is a tendency for the number of defective pixels to increase as the temperature of the imaging device 10 increases. That is, in step S10, when it is determined that the temperature of the imaging device 10 exceeds the predetermined temperature; there will be a large number of defective pixels. Accordingly, since transfer increases when the image signal is corrected using hardware, it is desirable to correct the image signal by using software instead. Therefore, in step S10, the correction method depends on the temperature of the imaging device 10. If the image signal is corrected using the software when the temperature is high, in other words when there is a large number of defective pixels, a clear image may be obtained.

Figure 4:
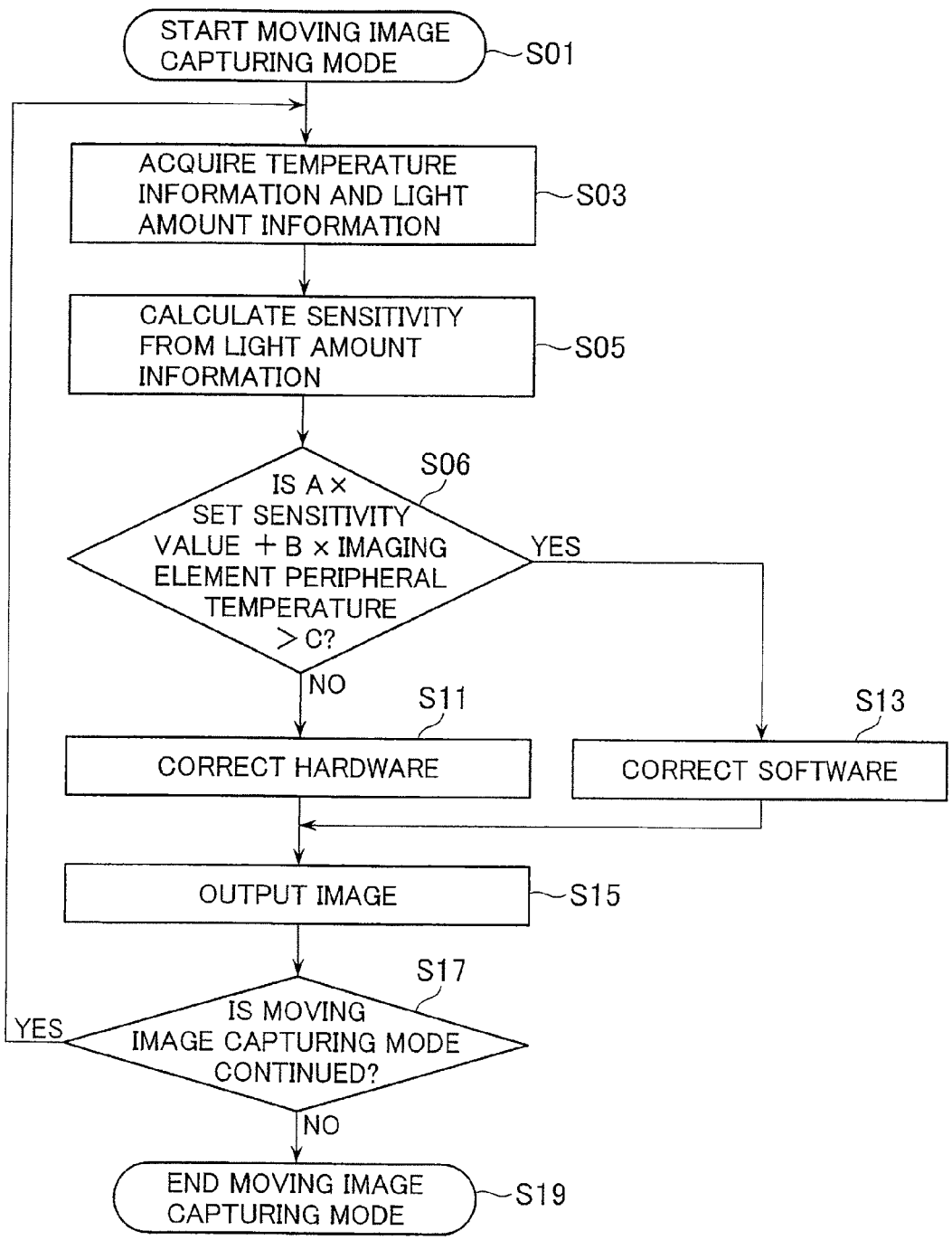
FIG. 4 is a flowchart of a third embodiment.

A third embodiment will be described by referring to FIG. 4. The electrical configuration of the third embodiment is the same as that of the first embodiment illustrated in FIG. 1. In FIG. 4, the same numerical reference figures are given to the same processes as those of the first embodiment. The third embodiment is different from the first embodiment because of the process of step S06. As specifically described below, FIG. 4 is a flowchart in which a defective pixel is corrected using software-based image processing when the switching reference value calculated from both temperature and light exceeds a predetermined value and the frame rate is the same as that of the normal imaging mode.

In the third embodiment, either hardware or software is used to process the image signal while the frame rate of the normal imaging mode is maintained. That is, the embodiment may be applied to a case where a processor (not illustrated) having a high image-processing capability is provided.

The switching reference value is defined as the product of the constant (A) and the set sensitivity value plus the product of the constant (B) and the temperature of the imaging device 10. In step S06, when it is determined that the switching reference value is larger than the constant C, step S13 is performed. On the other hand, when the switching reference value is smaller than the constant C, step S11 is performed.

There is a tendency for the number of defective pixels to increase as the temperature and sensitivity of the imaging device 10 both increase. That is, in step S06, when the switching reference value is determined to be larger than the constant C, there will be a large number of defective pixels. Accordingly, since transfer increases when the image signal is corrected using hardware, it is desirable to correct the image signal by using software instead. Therefore, in step S06, the correction method is selected based on the temperature and sensitivity of the imaging device 10. When the image signal is corrected with software in a state of high temperature and sensitivity, in other words when there are a large number of defective pixels, a clear image may be produced.

Furthermore, when the frame rate decreases, the frame rate is maintained for a predetermined time so that the exposure may be properly set by adjusting the sensitivity. However, during this predetermined time switching between hardware-based and software-based correction methods may be prohibited. Note that, in the above embodiment the frame rate of the normal imaging mode is set at 30 frames per second, but it may be set at 60 frames per second.

As will be understood by those familiar with the art, the present invention may be embodied in other specific forms without departing from the spirit or essential characteristics thereof. Accordingly, the disclosures and descriptions herein are intended to be illustrative, but not limiting, to the scope of the invention which is set forth in the following claims.

The present disclosure relates to subject matter contained in Japanese Patent Application No. 2011-193796 (filed on Sep. 6, 2011), which is expressly incorporated herein, by reference, in its entirety.

The invention claimed is:

1. An imaging apparatus capable of capturing a moving image using an imaging device, said imaging apparatus comprising:
    a first image processor that uses hardware to process an image captured by the imaging device;
    a second image processor that uses software to process an image captured by the imaging device;
    an image-processing switch that selectively operates one of said first image processor and said second image processor;
    a light detector that detects an amount of light received by the imaging device; and
    a sensitivity adjuster that increases sensitivity of the imaging device as the amount of light decreases,
    wherein said image-processing switch operates said first image processor when the sensitivity is lower than a predetermined value, and operates said second image processor when the sensitivity is higher than the predetermined value, and
    said first image processor and said second image processor perform a same process on the captured image.

2. The imaging apparatus according to claim 1, wherein said image-processing switch operates said second image processor when the sensitivity adjusted by said sensitivity adjuster is an upper limit value and a frame rate of a moving image capture mode is set to be lower than the frame rate of a normal imaging mode to obtain a proper exposure.

3. The imaging apparatus according to claim 1, further comprising:
a temperature detector that detects temperature of the imaging device.

4. The imaging apparatus according to claim 3, wherein said image-processing switch operates said second image processor when the sensitivity adjusted by said sensitivity adjuster is an upper limit value, the temperature detected by the temperature detector exceeds a predetermined value, and a frame rate of the moving image capture mode is set to be lower than the frame rate of a normal imaging mode to obtain a proper exposure.

5. The imaging apparatus according to claim 3, wherein said image-processing switch operates said second image processor when a switching reference value calculated from the temperature detected by said temperature detector and the light amount detected by said light detector exceeds a predetermined value, and a frame rate is adjusted to be the same as the frame rate of a normal imaging mode.

6. The imaging apparatus according to claim 1, wherein the image processing performed by said first image processor and said second image processor corrects a defective pixel.

7. An imaging apparatus capable of capturing a moving image using an imaging device, said imaging apparatus comprising:
a first image processor that uses hardware to process an image captured by the imaging device;
a second image processor that uses software to process an image captured by the imaging device;
an image-processing switch that selectively operates one of said first image processor and said second image processor;
a light detector that detects an amount of light received by the imaging device;
a sensitivity adjuster that increases sensitivity of the imaging device as the amount of light decreases; and
a temperature detector that detects temperature of the imaging device
wherein said image-processing switch operates said first image processor when the sensitivity is lower than a predetermined value, and operates said second image processor when the sensitivity is higher than the predetermined value,
wherein said image-processing switch operates said second image processor when the sensitivity adjusted by said sensitivity adjuster is an upper limit value, the temperature detected by the temperature detector exceeds a predetermined value, and a frame rate of the moving image capture mode is set to be lower than the frame rate of a normal imaging mode to obtain a proper exposure.

8. An imaging apparatus capable of capturing a moving image using an imaging device, said imaging apparatus comprising:
a first image processor that uses hardware to process an image captured by the imaging device;
a second image processor that uses software to process an image captured by the imaging device;
an image-processing switch that selectively operates one of said first image processor and said second image processor;
a light detector that detects an amount of light received by the imaging device;
a sensitivity adjuster that increases sensitivity of the imaging device as the amount of light decreases; and
a temperature detector that detects temperature of the imaging device
wherein said image-processing switch operates said first image processor when the sensitivity is lower than a predetermined value, and operates said second image processor when the sensitivity is higher than the predetermined value,
wherein said image-processing switch operates said second image processor when a switching reference value calculated from the temperature detected by said temperature detector and the light amount detected by said light detector exceeds a predetermined value, and a frame rate is adjusted to be the same as the frame rate of a normal imaging mode.

* * * * *